United States Patent
Boyd et al.

(10) Patent No.: US 6,518,347 B1
(45) Date of Patent: Feb. 11, 2003

(54) FLAME RETARDANT CARBONATE POLYMERS AND USE THEREOF

(75) Inventors: Steven D. Boyd, Woodbury, MN (US); William M. Lamanna, Stillwater, MN (US); Thomas P. Klun, Lakeland, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 154 days.

(21) Appl. No.: 09/749,101

(22) Filed: Dec. 27, 2000

(51) Int. Cl.[7] .................................................. C08K 5/09
(52) U.S. Cl. ........................ 524/395; 524/462; 524/463
(58) Field of Search ................................. 524/395, 462, 524/463

(56) References Cited

U.S. PATENT DOCUMENTS

| | | |
|---|---|---|
| 3,775,367 A | 11/1973 | Nouvertne |
| 3,929,720 A | 12/1975 | Rosendahl et al. |
| 4,092,291 A | 5/1978 | Mark |
| 4,387,222 A | 6/1983 | Koshar |
| 4,505,997 A | 3/1985 | Armand et al. |
| 4,555,540 A | 11/1985 | Avakian |
| 4,626,563 A | 12/1986 | Ogoe et al. |
| 4,774,273 A | 9/1988 | Kress et al. |
| 4,826,634 A | 5/1989 | Baasner et al. |
| 5,021,308 A | 6/1991 | Armand et al. |
| 5,072,040 A | 12/1991 | Armand |
| 5,162,177 A | 11/1992 | Armand et al. |
| 5,233,049 A * | 8/1993 | Dinan et al. ................. 548/462 |
| 5,273,840 A | 12/1993 | Dominey |
| 5,478,874 A | 12/1995 | Miyouga et al. |
| 5,514,493 A | 5/1996 | Waddell et al. |
| 5,554,664 A | 9/1996 | Lamanna et al. |
| 5,652,072 A | 7/1997 | Lamanna et al. |
| 5,723,664 A | 3/1998 | Sakaguchi et al. |
| 5,817,376 A | 10/1998 | Everaerts et al. |
| 5,874,616 A | 2/1999 | Howells et al. |
| 6,063,522 A | 5/2000 | Hamrock et al. ........... 429/250 |
| 6,114,419 A | 9/2000 | Liss et al. |

FOREIGN PATENT DOCUMENTS

| | | |
|---|---|---|
| EP | 0 162 243 | 11/1985 |
| EP | 0 058 403 | 1/1986 |
| EP | 0 825 662 A | 2/1998 |
| EP | 1 035 169 A | 9/2000 |
| JP | 06 287427 A | 10/1994 |
| JP | 11 273734 A | 10/1999 |
| WO | WO 00/11742 | 3/2000 |
| ZA | 98044155 | 5/1998 |

OTHER PUBLICATIONS

Encyclopedia of Polymer Science and Engineering, vol. 11, pp. 667–668.
J. Foropoulos, et al., Inorg Chem., 23, 3720 (1984).
Kirk–Othmer Encyclopedia of Chemical Technology, 4th Edition, vol. 19, pp. 584–609, John Wiley & Sons, N.Y., N.Y.
Kirk–Othmer Encyclopedia of Technology, 4th Ed., vol. 10, pp. 936–998, John Wiley & Sons, N.Y., N.Y., 1993.
Turowsky and Seppelt, Inorg. Chem., 27, 2135–2137, (1988).
USSN 09/412,850, filed Oct. 6, 1999, "Antistatic Composition", pp. 1–93.
USSN 09/474,711, filed Dec. 29, 1999, "Water–And Oil–Repellant, Antistatic Composition", pp. 1–86.

* cited by examiner

Primary Examiner—Peter Szekely
(74) Attorney, Agent, or Firm—Kent S. Kokko

(57) ABSTRACT

Flame retardant carbonate polymer compositions and articles prepared therefrom are described. The carbonate polymer contains a flame retardant additive comprising metal salts of a highly fluorinated methide, amide or imide anion. The composition provides flame retardancy at relatively low levels of additive, allows a broader processing window of additive compositions and can have high transparency.

32 Claims, No Drawings

FLAME RETARDANT CARBONATE POLYMERS AND USE THEREOF

FIELD OF THE INVENTION

The present invention is directed to flame retardant carbonate polymer compositions and articles prepared therefrom. The carbonate polymer contains a flame retardant additive comprising metal salts of highly fluorinated methides, imides or amides. The composition provides flame retardancy at relatively low levels of additive, may allow a broader processing window of additive compositions and can have high transparency.

Carbonate polymers, derived from the reaction of bishydroxy or dihydroxy compounds with carbonic acid derivatives are widely used because of their desirable physical and chemical properties. In particular, carbonate polymers are used in the manufacture of molded parts wherein rigidity, impact strength, toughness, ductility, heat stability, clarity and high dielectric properties are desired. Unfortunately, the carbonate polymers may exhibit a burning time when contacted with an open flame, and so are precluded from many applications for safety reasons. Many carbonate polymers, particular those derived from bisphenol-A, are classified as V-2 in the burning test defined in Underwriter's Laboratories Tests for Flammability of Plastic Materials test UL 94, of May 14, 1993.

Polycarbonates have been modified with various additives in attempts to reduce the flammability (or increase the combustion resistance). Such additives have included phosphites, phosphates, thiophosphoric acid esters containing halogenated alkyl radicals and other halogenated organic compounds. With many such additives, they must be added at relatively high weight percentages that may adversely affect the physical and/or optical properties of the resulting articles. Polytetrafluoroethylene has been added, as an anti-drip and flame retardant agent, to polycarbonate resins, but adversely affects the clarity and transparency of molded articles made therefrom. Glass fibers may be added, but the addition adversely affects the polymer matrix and optical properties. In many applications, the polycarbonate molding composition is rendered opaque by the addition of pigments to mask the reduced optical properties.

Perfluoroalkyl sulfonate salts have been added to polycarbonates. While they reduce the flammability of the resulting articles, they have a very narrow window of processibility. Too low a concentration and the flammability is not sufficiently reduced. Too high a concentration and the optical properties, such as transparency and clarity, suffer.

SUMMARY

The present invention is directed to flame retardant compositions comprising a carbonate polymer, and an additive metal salt comprising an anion selected from the group consisting of (a) a highly fluorinated methide, (b) a highly fluorinated imide, (c) a highly fluorinated amide, and any combinations thereof The flame retardant carbonate polymer compositions of the present invention are useful in the preparation of shaped articles, such as those produced by casting, molding or extrusion. Included are automobile parts, electric motors housings, appliances, computer equipment such as monitor housings, aircraft parts, glass replacement, optical and headlamp lenses. Because the additive metal salt may be added at sufficient levels to reduce the flammability of the article without deleteriously affecting the optical properties, the composition is particularly useful in those applications where transparency or clarity is desired but where heretofore, opaque polycarbonates have been used.

Anions useful as the anionic portion of the metal salt additives of the present invention may be generally classified as highly fluorinated (including perfluorinated) alkyl- or arylsulfonyl, imides, methides and amides. By "highly fluorinated" it is meant that the degree of fluorination on the chain is sufficient to provide the chain with properties similar to those of a perfluorinated chain. With respect to aromatic rings "highly fluorinated" means replacement of the aromatic hydrogen atoms without saturation of the aromatic ring. More particularly, a highly fluorinated alkyl group will have more than half the total number of hydrogen atoms on the chain replaced with fluorine atoms. Although hydrogen atoms may remain on the chain, it is preferred that all hydrogen atoms be replaced with fluorine to form a perfluoroalkyl group. Though not preferred for environmental reasons, any hydrogen atoms beyond at least half replaced with fluorine that are not replaced with fluorine may be replaced with bromine and or chlorine. It is more preferred that at least two-thirds of the hydrogen atoms on the alkyl group be replaced with fluorine, still more preferred that at least three-fourths of the hydrogen atoms be replaced with fluorine and most preferred that all hydrogen atoms be replaced with fluorine to form a perfluorinated alkyl group.

Preferred salts of this invention comprise fluorinated anions which are highly fluorinated imides or amides (I), or highly fluorinated methides (II) having the respective formulas:

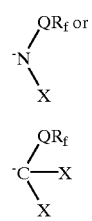

where
Q is a divalent organic linking group, preferably Q is selected from —SO$_2$—, —CO—, and —SO$_3$—;
X is selected from the groups: H, halide, alkyl, alkenyl, aryl, alkaryl, —SO$_2$R, —SO$_2$R$_f$, —SO$_2$F, —SO$_3$R, —C(O)R, and —C(O)R$_f$, and —CN, but is preferably —SO$_2$R$_f$,
R is selected from the group consisting of alkyl, cycloalkyl, aralkyl, substituted alkyl, aryl, and substituted aryl groups. The substituted aryl may contain halogen or haloalkyl substituents, preferably fluorine or fluoroalkyl substituents,
R$_f$ is a fluorinated aromatic or aliphatic radical containing at least one carbon atom.
Where the radical contains a plurality of carbon atoms in a skeletal chain, such chain may be linear, branched, acyclic, cyclic, saturated or unsatured. The skeletal chain of carbon atoms can be interrupted by heteroatoms, such as divalent oxygen or trivalent nitrogen atoms each of which is bonded only to carbon atoms, or hexavalent sulfur atoms each of which may be bonded to carbon, fluorine, or oxygen atoms, but preferably where such heteroatoms are present, such skeletal chain does not contain more than one said heteromoiety for every two carbon atoms. Carbon bonded hydrogen atoms, bromine atoms or chlorine atoms may be present. Where present, however, they preferably are present not more than once for every two carbon atoms on the average. Thus, the non-skeletal valence bonds are preferably carbon-to-fluorine bonds. That is, $R_f$ is preferably perfluorinated.

The total number of carbon atoms in $R_f$ can vary and be, for example, 1 to 12, preferably 1 to 8, and more preferably 1 to 4. Where $R_f$ is or contains a cyclic structure, such structure preferably has 5 or 6 ring members, one or two of which can be said heteroatoms, e.g., oxygen and/or nitrogen. Where two or more $R_f$ groups occur in a single formula, they can be the same or different and may be linked together to form a cyclic structure. Alternatively, $R_f$ can be a fluorinated or fluoroalkylated aromatic group or a fluorine atom. The methides, amides and imides may also be cyclic, when a combination of any two $R_f$ groups are linked to form a cyclic structure.

Preferred salts of this invention comprise fluorinated anions that are highly fluorinated imides or amides or highly flurorinated methides.

The additive salts may be monomeric, dimeric, oligomeric or polymeric in nature.

The most preferable salts may be generally classified as highly fluorinated (including perfluorinated) tris alkyl- or arylsulfonyl methides, and the corresponding bis alkyl- or arylsulfonyl imides, as represented by Formulas III and IV, respectively, and hereinafter referred to as "methide" and "imide" anions, respectively, for brevity, $$(R_fSO_2)_3C^- \qquad (III)$$

and $$(R_fSO_2)_2N^- \qquad (IV),$$

wherein each $R_f$ is independently selected from the group consisting of highly fluorinated or perfluorinated alkyl or fluorinated aryl radicals. The methides and imides may also be cyclic, when a combination of any two $R_f$ groups are linked to form a cyclic structure.

Examples of anions useful in the practice of this invention include:
$(C_2F_5SO_2)_2N^-$, $(C_4F_9SO_2)_2N^-$, $(C_8F_{17}SO_2)_3C^-$, $(CF_3SO_2)_3C^-$, $(CF_3SO_2)_2N^-$, $(C_4F_9SO_2)_3C^-$, $(CF_3SO_2)_2(C_4F_9SO_2)C^-$, $(CF_3SO_2)(C_4F_9SO_2)N^-$, $[(CF_3)_2NC_2F_4SO_2]_2N^-$, $(CF_3)_2NC_2F_4SO_2C^-(SO_2CF_3)_2$, $(3,5-(CF_3)_2C_6H_3SO_2)N^-SO_2CF_3$, $C_6F_5SO_2C^-(SO_2CF_3)_2$, $C_6F_5SO_2N^-SO_2CF_3$, $CF_3SO_2(CN)N^-$, $CF_3SO_2(CN)_2C^-$, $CF_3SO_2NH^-$, $(CF_3SO_2)_2CH^-$, $C_4F_9SO_2(CN)N^-$, $C_4F_9SO_2(CN)_2C^-$, $C_4F_9SO_2NH^-$, $(C_4F_9SO_2)_2CH^-$,

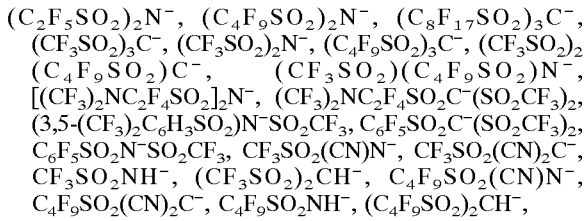

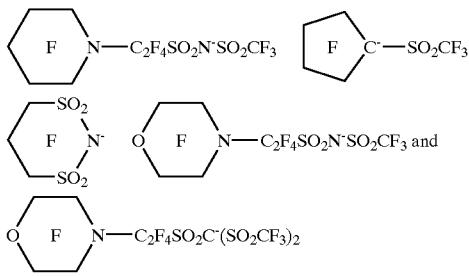

"F" in the ring indicates a perfluorinated ring.

Anions of this type, and representative syntheses, are described in, e.g., U.S. Pat. Nos. 4,505,997, 5,021,308, 4,387,222, 5,072,040, 5,162,177, and 5,273,840, 5,723,664, 5,874,616, incorporated herein by reference in ZA 98044155 and in Turowsky and Seppelt, Inorg. Chem., 27, 2135–2137, (1988). Turowsky and Seppelt describe the direct synthesis of the $(CF_3SO_2)_3C^-$ anion from $CF_3SO_2F$ and $CH_3MgCl$. Further, an efficient process for the preparation of anions such as $(CF_3SO_2)_3C^-$ is described in U.S. Pat. No. 5,554,664 (Lamanna et al.) incorporated herein by reference. Salts of the general formula $R_fSO_2(CN)N^-$ and $R_fSO_2(CN)2C^-$ may be prepared as described in WO 00/11742.

Any metal cation may be used as the cation of the flame-retardant additive salts. Alkali metal and alkali-earth metal salts are preferred. It will be understood that if the valence of the metal cation is greater than 1, an equal number of anions will be associated with the metal. This may comprise multiple methide, amide or imide anions, or a mixture with a non-reactive anion such as a halide anion or an anion of the formulas $(R_fSO_2)_3C^-$, $(R_fSO_2)_2N^-$, $R_fSO_2NH^-$, and $R_fSO_3^-$. The additive metal salt therefore may comprise compounds of the formula $$(R_fSO_2)_3C^-M^{2+}X'^-$$

or $$(R_fSO_2)_2N^-M^{2+}X'^-$$

wherein
$M^{2+}$ is a metal salt of valency 2+ and
X' is a halide anion, $(R_fSO_2)_3C^-$, $(R_fSO_2)_2N^-$, $R_fSO_3^-$, $R_fSO_2NH^-$, $SO_3^{2-}$, $PO_4^{3-}$ $SbF_6^-$, $PF_6^-$, $BF_4^-$, $ClO_4^-$, $SO_4^{2-}$ or $NO_3^-$.

Useful carbonate polymers include aliphatic and aromatic carbonate homo- and copolymers, as well as blends thereof may be used in the carbonate polymer composition of this invention.

Aromatic carbonate polymer resins useful in the flame retardant carbonate polymer compositions may be any carbonate polymer useful for molding, casting or extrusion. Carbonate polymers may be derived from but are not limited to bisphenols derived from the condensation of 2 moles of phenol with aldehydes and ketones such as acetone, formaldehyde, cyclopentanone and fluorenone. Examples include, but are not limited to 2,2-bis-(4-hydroxyphenyl) propane (known as bisphenol-A), bis-(4-hydroxyphenyl) methane, 2,2-bis-(4-hydroxy-3,5-dimethylphenyl)propane, 2,2-bis-(4-hydroxy-3-methylphenyl)propane, 2,2-bis-(4-hydroxy-3,5-dibromophenyl)propane, 2,2-bis-(4-hydroxy-3-methylphenyl)methane, 1,1-bis-(4-hydroxyphenyl) cyclohexane, 1-bis-(4-hydroxyphenyl)sulfide, 2,2-bis-(4-hydroxy-3,5-dimethylphenyl)heptane.

Halogenated bis-hydroxyphenyl compounds may also be used, exemplified but not limited to 2,2-(3,5,3',5'-tetrachloro-4,4'dihydroxydiphenyl)propane, 2,2-(3,5,3',5'-tetrabromo-4,4'dihydroxydiphenyl)propane, (3,3'-dichloro-4,4'dihydroxyphenyl)methane, 2,2-(3,5,-dichloro-4, 4'dihydroxydiphenyl)propane, 2,2-(3,5,-dibromo-4, 4'dihydroxydiphenyl)propane and the like. Other useful bis-hydroxyphenyl compounds are described in Kirk-Othmer Encyclopedia of Chemical Technology, $4^{th}$ Edition, volume 19, pages 584–609, John Wiley and Sons, N.Y., N.Y., Of the above, bis-(hydroxyphenyl-alkylidines), exemplified by bisphenol-A are preferred. Preferred bisphenol-A composition include homopolymers and blends thereof and copolymers including 4,4'-dihydroxydiphenyl, bis-(4-hydroxyphenyl)-p-isopropylbenzene, hydroquinone, bis-(hydroxyphenyl)sulfides, bis-(hydroxyphenyl)ethers, bis-(hydroxyphenyl)ketones, bis-(hydroxyphenyl)sulfoxides, and bis-(hydroxyphenyl)sulfones, The carbonate copolymer may comprise up to 20 weight percent of other bis-hydroxyphenyl compounds or dihydroxy phenyl compounds, based on the weight of the copolymers. A blend or mixture of a bisphenol-A homopolymer preferably may comprise up to 20 weight percent of homo- or copolymers based on other bis- or dihydroxyphenyl compounds.

If desired, it is within the scope of the invention for the carbonate polymer to comprise two or more different bis- or di-hydroxyphenyl compounds or a copolymer of a dihydroxyphenyl compound with a diol or with a hydroxy- or acid-terminated polyesters, or with a dibasic acid where a carbonate copolymer or interpolymer rather than a homopolymer is desired. Thus, the carbonate composition may comprise two or more of the above bis- or dihydroxyphenyl compounds, or blends of homo- and copolymers derived from the bis- or dihydroxyphenyl compounds.

Other useful carbonate polymers may be prepared by ring-opening polymerization of cyclic polycarbonate precursors. Such carbonate polymers are available, for example, from Cyclic Corp, Rennselaer, N.Y.

Commercially available carbonate polymers that may be used in this invention include Calibre™ from Dow Chemical, and Makrolon™, Bayfol™ and Apec™ from Bayer A. G., Lexan™ from GE Plastics and Panlite™ from Idemitsu.

The carbonate copolymer may be branched by inclusion of small amounts, preferably amounts of about 0.05 to 2 mole percent (based on dihydroxy phenols used, of polyfunctional compounds such as trifunctional compounds, particularly those with at least three aryl hydroxy groups. Examples of useful trifunctional compounds include 2,4-bis-(hydroxyphenyl-isopropyl)phenol, 2,6-bis-(2'-hydroxy-5'-methyl-benzyl)-4-methylphenol, 2-(4-hydroxyphenyl)-2-(2,4-dihydroxyphenyl)propane and 1,4-bis-(4,4'dihydroxytriphenyl-methyl)benzene, 2,4-dihydroxybenzoic acid, trimesic acid, cyanuric chloride and 3,3-bis-(4-hydroxy-3-methylphenyl)2-oxo-2,3-dihydroindole.

The carbonate precursor that is reacted with the described dihydroxy compounds is generally a carbonyl halide, a carbonate ester or a haloformate. The carbonyl halides from which the carbonate polymers may be prepared include carbonyl chloride, carbonyl bromide and mixtures thereof The carbonate esters from which the carbonate polymers may be prepared include diphenyl carbonate, di-(halophenyl)carbonate, such as di-(chlorophenyl)carbonate, di-(bromophenyl)carbonate, di-(trichlorophenyl)carbonate, and the like, di-(alkylphenyl)carbonate, such as ditolyl carbonate, dinapthyl carbonate, phenyl tolyl carbonate, and the like, and mixtures thereof The haloformates from which the carbonate polymers may be prepared include bis-haloformates of dihydroxyl phenols such as bis-haloformates of hydroquinone and the like, bis-haloformates of ethylene glycol. While other carbonate polymer precursors are known in the art and may be used, phosgene is preferred.

The carbonate polymers are generally prepared using a molecular weight regulator, an acid scavenger and a catalyst. Useful molecular weight regulators include mono-hydroxy compounds such as phenol, t-butyl phenol, bromophenol, and the like. The acid scavenger may be an organic or inorganic base, Suitable organic bases include pyridine, triethyl amine, dimethyl amine, dimethyl aniline, and the like. Useful inorganic bases include a hydroxide, a carbonate, a bicarbonate, or an alkali- or alkali-earth metal phosphate. Useful syntheses of carbonate polymers are described in Kirk-Othmer (supra) and include the Schotten-Bauman reaction of phosgene and bis- or dihydroxyphenyl compounds in an amine catalyzed interfacial condensation reaction, ring-opening polymerization of a cyclic carbonate precursor, or the base catalyzed transesterification of an bis- or dihydroxyphenyl compounds with a monomeric carbonate.

Suitable catalysts for base-catalyzed transesterification are exemplified by tertiary amines such as trimethyl amine, triethyl amine, dimethylaniline, quaternary ammonium compounds such as tetraethyl ammonium bromide, cetyl triethyl ammonium bromide, tetramethyl ammonium hydroxide, benzyl trimethyl ammonium chloride and tetramethyl ammonium chloride; and quaternary phosphonium compounds such as butyl triphenyl phosphonium bromide.

The carbonate polymers generally have a $M_w$ of between 10,000 and 200,000, preferably between 20,000 and 80,000. The Mw may be measured, for example by the light scattering chromatography, gel-permeation chromatography, or by measurement of intrinsic or inherent viscosity, as such techniques are known in the art. Preferably the carbonate polymer is of injection-molding grade having an intrinsic viscosity of 0.50–0.55 dL/g in chloroform at 30° C. Preferably the carbonate polymers are clear and colorless, i.e. optically clear and transparent.

Shaped articles (e.g., molded, cast, or extruded articles) of this invention can be made, e.g., by blending or otherwise uniformly mixing an effective amount of the additive and the polymer, for example by intimately mixing the additive with pelletized or powdered polymer, and melt extruding the mixture into shaped articles such as pellets, fibers, or films by known methods. By effective amount, it is meant an amount sufficient to improve the flame retardancy of the carbonate polymer. Typically the additive is added in amounts of 0.01 to 2 weight percent, relative to the carbonate polymer. Preferably, the highly fluorinated methide or highly fluorinated imide additive is used in amounts of 0.1 to 1.0 weight percent.

Shaped articles may also be prepared by polymerizing a cyclic polymer precursor in the presence of the flame retardant additive.

The additive can be mixed per se with the polymer or can be mixed with the polymer in the form of a "masterbatch" (concentrate) of the additive salt in the polymer. Masterbatches of polymers are prepared to achieve better mixing and homogeneity of relatively low concentrations of additives throughout the polymer. Masterbatches typically contain about 5–20 times or more preferably 10 to 15 times the concentration of the final desired level of the additive. Also, an organic solution of the additive may be mixed with the powdered or pelletized polymer, the mixture dried to remove solvent, then melted and extruded or molded into the desired shaped article. Alternatively, the molten additive or masterbatch) can be injected into a molten polymer stream to form a blend just prior to shaping into the desired article.

If desired, the flame-retardant additive may also comprise one or more secondary flame-retardant additives. Useful secondary flame retardant additives may include, but are not limited to, halogenated organic compounds, organic phosphorus-containing compounds (such as organic phosphates), inorganic compounds and inherently flame retardant polymers. The secondary flame-retardant additive may comprise 1 to 99 weight percent, relative to the total amount of flame retardant present in the composition. Useful secondary flame-retardant additives are described, for example, in the Kirk-Othmer Encyclopedia of Technology, $4^{th}$ Ed., vol. 10, pp 954–76, John Wiley & Sons, N.Y., N.Y., 1993.

The preferred secondary additive, if present, are fluoroalkylsulfonates, which may be used (in combination with the highly fluorinated imides, methides and amides) at higher total loading while maintaining optical clarity. Fluoroalkylsulfonates are described in U.S. Pat. No. 3,775,367 (Nouvertneet al.) the disclosure of which is incorporated herein by reference.

Included within the scope of halogenated organic secondary flame retardant additives are substituted benzenes, exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

The preferred halogenated organic secondary flame retardant additives for this invention are aromatic halogen compounds such as brominated benzene, chlorinated biphenyl, or a compound comprising two phenyl radicals separated by a divalent linking group (such as a covalent bond or alkylene group) and having at least two chlorine or bromine atoms per phenyl nucleus, and mixtures thereof. Especially preferred are decabromodiphenyl oxide, pentabromodiphenyl oxide, and octabromodiphenyl oxide.

Among the useful organic phosphorus secondary additives are organic phosphorus compounds, phosphorus-nitrogen compounds and halogenated organic phosphorus compounds. Often organic phosphorus compoundsfunction as flame-retardants by forming protective liquid or char barriers, which minimize transpiration of polymer degradation products to the flame and/or act as an insulating barrier to minimize heat transfer.

In general, the preferred phosphate compounds are selected from organic phosphonic acids, phosphonates, phosphinates, phosphonites, phosphinites, phosphine oxides, phosphines, phosphites or phosphates. Illustrative is triphenyl phosphine oxide. These can be used alone or mixed with hexabromobenzene or a chlorinated biphenyl and, optionally, antimony oxide. Phosphorus-containing flame retardant additives are described, for example, in Kirk-Othmer (supra) pp. 976–98.

Also suitable as secondary flame-retardant additives for this invention are compounds containing phosphorus-nitrogen bonds, such as phosphonitrilic chloride, phosphorus ester amides, phosphoric acid amides, phosphonic acid amides or phosphinic acid amides.

Among the useful inorganic secondary flame retardant additives include compounds of antimony, such as include antimony trioxide, antimony pentoxide, and sodium antimonate; boron, such as barium metaborate, boric acid, sodium borate and zinc borate; aluminum, such as alumina trihydrate; magnesium, such as magnesium hydroxide; molybdenum, such as molybdic oxide, ammonium molybdate and zinc molybdate, phosphorus, such as phosphoric acid; and tin, such as zinc stannate. The mode of action is often varied and may include inert gas dilution, (by liberating water for example), and thermal quenching (by endothermic degradation of the additive). Useful inorganic additives are described for example in Kirk-Othmer (supra), pp 936–54.

Other useful secondary additives include aromatic metal sulfonate salts, as described in EP 162243 and in EP 58403.

The secondary flame retardant additive may be chosen from fine particles of an inherently flame retardant polymer. Inherently flame retardant polymers, due to their chemical structure, either do not support combustion, or are self-extinguishing. These polymers often have increased stability at higher temperatures by incorporating stronger bonds (such as aromatic rings or inorganic bonds) in the backbone of the polymers or are highly halogenated. Examples of inherently flame retardant polymers include poly(vinyl chloride), poly(vinylidine chloride), chlorinated polyethylene, polyimides, polybenzimidazoles, polyether ketones, polyphosphazenes, and polytetrafluoroethylene. Useful inherently flame retardant films generally have a Limiting Oxygen Index (LOI) of at least 28% as determined by ASTM D-2863-91.

Especially useful are mixed additives of an antimony additive and a halogenated organic additive, described as "antimony-halogen" additives which produces an especially effective secondary flame retardant. The two additives react synergistically at flame temperatures to produce an antimony halide or oxyhalide that produce radical species (which compete with chain propagating and branching steps in the combustion process) as well as promoting char formation.

In addition to the flame retardant additive, the carbonate polymer composition may further comprise other additives such as dyes, pigments, UV stabilizers, antioxidants, heat stabilizers, mold release agents, fillers and anti-drip agents.
Preparation of Flame Retardant Additives (i) Sulfonate salts (Sample Nos. C2–C9, Table C and Sample Nos. 39A–51B. Table D). Potassium perfluorobutanesulfonate used as flame retardant additive is available from 3M, St Paul, Minn. The remaining sulfonate salts (Sample Nos. C6–C9, Table C) were prepared by known methods of reacting appropriate alkali metal hydroxides or carbonates of weak bases with the appropriate strong perfluoroalkanesulfonic acid.

(ii) Imide Salts (Sample Nos. 1–26, Table C and Sample Nos. 39A–51B, Table D). The imide salts were essentially prepared according to syntheses described in U.S. Pat. Nos. 5,652,072 and 5,874,616.

(iii) Potassium amide salt (Sample Nos. 27–28. Table C). The potassium amide salt, $C_4F_9SO_2NH^{-+}K$, was prepared essentially according to the synthesis outlined by J Foropoulos, et al., Inorg. Chem., 23, 3720 (1984).

(iv) Methide salts (Sample Nos. 28–30. Table C). The methide salts were essentially prepared according to syntheses described in U.S. Pat. Nos. 5,514,493, 5,554,664 5,273,840 and Turowsky et al., Inorg. Chem., 27, 2135 (1988).

Testing of Carbonate Polymer Plaques with Flame Retardant Additives

Clarity Test. The clarity test of the prepared polymer plaques was based on visual inspection. The rating system is outlined in Table A.

TABLE A

| Clarity Value | Definition |
|---|---|
| 0 | Sample is clear |
| 1 | Sample is hazy |
| 2 | Sample is opaque |

An expanded interpretation of this clarity test can be advanced by the reading of newsprint through a plaque that is placed parallel to and 7.6 cm from the surface of the newsprint. A "0" rating means the newsprint can be clearly read, a "1" rating means the newsprint can still be read but with diminished edge contrast and a "2" rating indicates the newsprint is not readable.

Flame Retardant Test. A modified version of the Underwriters Laboratory Test for Flammability of Plastic Materials for Parts in Devices and Appliances (UL-94; May 14, 1993) was used for testing flame retardancy of the polycarbonate plaques. Vertical burning tests were performed.

Three modifications to UL-94 test procedure were made:
(i) Samples were not preconditioned prior to testing
(ii) A cotton indicator was not placed under the specimen to be tested due to safety considerations. If upon burning a plaque it issued a molten drip, the plaque was assigned a V-2 rating
(iii) If one sample plaque from the set of five sample plaques didn't comply with the requirements, no additional testing was performed.

The UL-94 test that included these modifications is designated herein as UL-94*.

TABLE B

Material Classifications of UL-94

| Criteria Conditions | V-0 | V-1 | V-2 |
|---|---|---|---|
| Afterflame time for each individual specimen $t_1$ or $t_2$ | $\leq$10 sec | $\leq$30 sec | $\leq$30 sec |
| Total afterflame time for any condition set ($t_1 + t_2$ for the five specimens) | $\leq$50 sec | $\leq$250 sec | $\leq$250 sec |
| Afterflame plus afterglow time for each individual specimen after the second flame application ($t_2 + t_3$) | $\leq$30 sec | $\leq$60 sec | $\leq$60 sec |
| Afterflame or afterglow of any specimen up to the holding clamp | No | No | No |
| Cotton indicator ignited by flaming particles or drops | No | No | Yes |

Preparation of Carbonate Polymer Plaques with Flame Retardant Additives 110 g of LEXAN™ high flow polycarbonate resin powder 105-111N (GE Plastics, Mount Vernon, Ind.), 110 g of LEXAN™ low flow polycarbonate resin powder 105-111N (GE Plastics, Mount Vernon, Ind.) and 0.176 g potassium perfluorobutanesulfonate (3M, St. Paul, Minn.) were placed in a one gallon paperboard container and mixed for one minute at a range of 300–500 rpm with a drill equipped with a three-bladed mixing impeller. The ensuing intimate mixture was placed in a mixing bowl fitted with cam rollers driven by a Haake Rhoemix 3000 (available from Thermohaake, Barrington, Ill.) @ 300° C., allowing it to be melted and mixed at a mixing rate of 15 rpm for the first 2 minutes and at 50 rpm for 8 minutes. The melted mass was removed from the apparatus, cooled and guillotined into pieces using an air activated knife. The resulting guillotined pieces were further ground into approximately 0.3 cm cubes using a mechanical grinder (Thomas Wiley Laboratory Mill, Model 43000; available from Rubber City Machinery Corp, Akron, Ohio) and oven dried at 110° C. for 10 hours. Next a construction was assembled to allow for molding of plaques. On top of a steel caul plate (30.48 cm by 38.74 cm with a thickness of 0.3175 cm) were symmetrically placed four 12 cm by 20 cm sheets of polyimide film (available from Dupont, Wilmington, Del.) each centered under one of the four 10 cm by 18 cm frames in a 30.48 cm by 38.74 cm mold with suitable thickness to yield plaques of the desired thickness. A suitable quantity of the resulting ground, dried sample (about 55 g for 3.35 mm thick samples and about 33.5 g for 2.13 or 1.93 mm thick samples) was evenly placed in each frame of 10 cm by 18 cm dimension and each frame was covered with another 12 cm by 20 cm sheet of polyimide film. Then another caul plate was placed on top of the polyimide film and the entire construction was placed in a compression mold press (available from Wabasha Metal Products, Inc). The press was manually adjusted to gradually increase the pressure on the samples to promote flow of the resin at 288° C. during first 8 minutes of molding. Next it was held at a pressure ranging from about 1,000 kg to 30,000 kg for 2 minutes. Finally, the sample was held at about 60,000 kg on a ram with a 20 cm diameter for 5 minutes after which time the frame containing the sample was removed from the press and allowed to cool to room temperature (25° C.). Upon removing the plaque from the frame, the plaque was cut into rectangles of 1.25 cm by 18.0 cm dimensions on a band saw to prepare samples for flame retardant testing using UL-94* test procedure. Some sample plaques prepared using this preparation method contained air bubbles and some were yellow in color.

Other flame retardant-containing carbonate polymer plaques were made following the procedure described in the previous paragraph, substituting the appropriate amount(s) and type(s) of flame retardant(s) for potassium perfluorobutanesulfonate to achieve target concentrations. In some cases, the mixing time on the Haake Rheomix 3000 at 50 rpm varied from 1 to 8 minutes. All percentages of additives given are by weight with respect to the carbonate polymer unless otherwise specified.

Performance of Carbonate Polymer Plaques with Flame Retardant Additives

The 50/50 mix of high and low flow Lexan™ Polycarbonate resin plaque with no flame retardant additive(s) (Sample No. C1, Table C) exhibited a V-2 UL-94* rating with a clarity value of "0". For some applications where transparency is required, it is desirable to maintain the "0" clarity value of this control sample while improving UL-94* flame retardant ratings (V-1 or V-0).

Potassium perfluorobutanesulfonate, $C_4F_9SO_3^{-+}K$, (Sample Nos. C2–C5, Table C) plaques at all concentrations investigated exhibited UL-94* ratings of V-0. Clarity values for $C_4F_9SO_3^{-+}K$ samples @ 0.08% and 0.10% were "1" and "2" respectively. Lithium perfluorobutanesulfonate, $C_4F_9SO_3^{-+}Li$, @ 0.16% (Sample No. C9, Table C) exhibited a V-0 UL-94* rating and "0" clarity rating.

Lithium imide salts and potassium imide salts (Sample Nos. 1–4 and 8–21, Table C) all showed V-0 UL-94* ratings and "0" clarity ratings with the exception of samples of $(C_4F_9SO_2)_2N^{-+}K$ @ 1.28% & 2.56% (Samples 16 and 17, Table C) where the clarity rating was "2".

The sodium imide salt, $(CF_3SO_2)_2N^{-+}Na$, (Sample Nos. 5–7, Table C) plaques exhibited UL-94* ratings of V-0 and had clarity values of "0" even at elevated $(CF_3SO_2)_2N^{-+}Na$ concentrations of 0.32%. Thinner plaques prepared at 2.13 mm containing 0.32% $(CF_3SO_2)_2N^{-+}Na$ additive exhibited FR rating of V-0.

Potassium amide salt $C_4F_9SO_2NH^{-+}K$ (Sample Nos. 27 and 28; Table C) plaques exhibited UL-94* ratings of V-0, with clarity values of "2".

Lithium methide salts and potassium methide salts (Sample Nos. 29, 30 and 31, Table C) all exhibited UL-94* ratings of V-0. Surprisingly, the sample of $(CF_3SO_2)_3C^{-+}Li$ at a concentration of 0.16% showed a clarity value of "0".

Plaques containing calcium bis(bis (perfluoromethanesulfonyl)imide), $Ca(N(SO_2CF_3)_2)_2$, in the concentration range from 0.08% to 1.28% (Sample Nos. 22–26, Table C) exhibited UL-94* ratings of V-1 and V-2, and these plaques at all concentration levels investigated showed a clarity value of "0".

All 3.35 mm thick plaques containing two flame retardants (Sample Nos. in Table D with "A" designator suffixes), with the exception of Sample No. 49A, exhibited desirable UL-94* ratings of V-0 and exceeded the UL-94* ratings of V-2 of the polycarbonate control plaques containing no flame retardant (Sample No. C1A, Table D). Six of the 2.13 mm thick plaques containing two flame retardants (Sample Nos. 41B, 42B, 44B, 48B, 50B and 51B, Table D) exhibited UL-94 ratings of V-0 and exceeded the UL-94* ratings of V-2 of the polycarbonate control plaques containing no flame retardant (Sample No. C1A, Table D). Additionally, six of the 2.13 mm thick plaques containing two flame retardants (Sample Nos. 41B, 42B, 44B, 48B, 50B and 51B, Table D) exhibited UL-94 ratings of V-0 and exceeded the UL-94* ratings of the 2.13 mm plaques containing $C_4F_9SO_3^-{}^+K$ (Sample Nos. C2B, C3B, and C4B, Table D).

Mixtures of potassium perfluorobutanesulfonate, $C_4F_9SO_3^-{}^+K$, with $Ca(N(SO_2CF_3)_2)_2$ at varied concentration levels and sample plaque thicknesses (Sample Nos. 48A, 48B 49A and 49B, Table D) exhibited clarity values of "0". Increasing the concentration of $Ca(N(SO_2CF_3)_2)_2$ from 0.04% to 0.12% changed the UL-94* ratings of these plaques from V-0 to V-2, irrespective of plaque thickness.

TABLE C

| Sample No. | FR Additive | weight % FR Additive | Plaque Thickness (mm) | UL-94* Classification | Clarity (thickness of plaque in mm) | $t_1$ (sec) + $t_2$ (sec) = Total Burn Time (sec) | Drips after $t_2$ |
|---|---|---|---|---|---|---|---|
| C1 | None | 0 | 3.35 | V-2 | 0 (1.93) | 15 + 93 = 108 | YES |
| C2 | $C_4F_9SO_3^-{}^+K$ | 0.04 | 3.35 | V-0 | 0 (3.35) | 3 + 23 = 26 | NO |
| C3 | $C_4F_9SO_3^-{}^+K$ | 0.06 | 3.35 | V-0 | 0 (1.93) | 1 + 5.5 = 6.5 | NO |
| C4 | $C_4F_9SO_3^-{}^+K$ | 0.08 | 3.35 | V-0 | 1 (1.93) | 9 + 16.5 = 25.5 | NO |
| C5 | $C_4F_9SO_3^-{}^+K$ | 0.1 | 3.35 | V-0 | 2 (1.93) | 2.5 + 13.0 = 15.5 | NO |
| C6 | $CF_3SO_3^-{}^+K$ | 0.08 | 3.35 | V-0 | 1 (1.93) | 4 + 8.5 = 12.5 | NO |
| C7 | $CF_3SO_3^-{}^+K$ | 0.16 | 3.35 | V-0 | 2 (1.93) | 3 + 4 = 7 | NO |
| C8 | $CF_3SO_3^-{}^+Na$ | 0.16 | 3.35 | V-0 | 1 (3.35) | 5.5 + 19 = 24.5 | NO |
| C9 | $C_4F_9SO_3^-{}^+Li$ | 0.16 | 3.35 | V-0 | 0 (1.93) | 4 + 2 = 6 | NO |
| 1 | $(CF_3SO_2)_2N^-{}^+K$ | 0.08 | 3.35 | V-0 | 0 (1.93) | 1 + 10 = 11 | NO |
| 2 | $(CF_3SO_2)_2N^-{}^+K$ | 0.16 | 3.35 | V-0 | 0 (1.93) | 2.5 + 13 = 15.5 | NO |
| 3 | $(CF_3SO_2)_2N^-{}^+K$ | 0.32 | 3.35 | V-0 | 0 (3.35) | 7.5 + 12 = 19.5 | NO |
| 4 | $(CF_3SO_2)_2N^-{}^+K$ | 0.64 | 3.35 | V-0 | 0 (3.35) | 3 + 6.5 = 9.5 | NO |
| 5 | $(CF_3SO_2)_2N^-{}^+Na$ | 0.08 | 3.35 | V-0 | 0 (3.35) | 4.5 + 7 = 11.5 | NO |
| 6 | $(CF_3SO_2)_2N^-{}^+Na$ | 0.16 | 3.35 | V-0 | 0 (3.35) | 7 + 13 = 20 | NO |
| 7 | $(CF_3SO_2)_2N^-{}^+Na$ | 0.32 | 3.35 | V-0 | 0 (3.35) | 6 + 19 = 25 | NO |
| 8 | $(C_2F_5SO_2)_2N^-{}^+K$ | 0.08 | 3.35 | V-0 | 0 (1.93) | 2.5 + 7 = 9.5 | NO |
| 9 | $(C_2F_5SO_2)_2N^-{}^+K$ | 0.16 | 3.35 | V-0 | 0 (1.93) | 2 + 21.5 = 23.5 | NO |
| 10 | $(C_2F_5SO_2)_2N^-{}^+K$ | 0.32 | 3.35 | V-0 | 0 (3.35) | 3 + 21 = 24 | NO |
| 11 | $(C_2F_5SO_2)_2N^-{}^+K$ | 0.64 | 3.35 | V-0 | 0 (3.35) | 10 + 17 = 27 | NO |
| 12 | $(C_4F_9SO_2)_2N^-{}^+K$ | 0.08 | 3.35 | V-0 | 0 (1.93) | 2.5 + 10.5 = 13 | NO |
| 13 | $(C_4F_9SO_2)_2N^-{}^+K$ | 0.16 | 3.35 | V-0 | 0 (1.93) | 5 + 16.5 = 21.5 | NO |
| 14 | $(C_4F_9SO_2)_2N^-{}^+K$ | 0.32 | 3.35 | V-0 | 0 (3.35) | 4.5 + 24 = 28.5 | NO |
| 15 | $(C_4F_9SO_2)_2N^-{}^+K$ | 0.64 | 3.35 | V-0 | 0 (3.35) | 8.5 + 20 = 28.5 | NO |
| 16 | $(C_4F_9SO_2)_2N^-{}^+K$ | 1.28 | 3.35 | V-0 | 2 (3.35) | 11.5 + 21 = 32.5 | NO |
| 17 | $(C_4F_9SO_2)_2N^-{}^+K$ | 2.56 | 3.35 | V-0 | 2 (3.35) | 8.5 + 29 = 37.5 | NO |
| 18 | $(CF_3SO_2)_2N^-{}^+Li$ | 0.08 | 3.35 | V-0 | 0 (1.93) | 5 + 19.5 = 24.5 | NO |
| 19 | $(CF_3SO_2)_2N^-{}^+Li$ | 0.16 | 3.35 | V-0 | 0 (1.93) | 1.5 + 16 = 17.5 | NO |
| 20 | $(CF_3SO_2)_2N^-{}^+Li$ | 0.32 | 3.35 | V-0 | 0 (3.35) | 3.5 + 12 = 15.5 | NO |
| 21 | $(CF_3SO_2)_2N^-{}^+Li$ | 0.64 | 3.35 | V-0 | 0 (3.35) | 2.5 + 4.5 = 7 | NO |
| 22 | $Ca(N(SO_2CF_3)_2)_2$ | 0.08 | 3.35 | V-2 | 0 (3.35) | 3 + 79 = 82 | YES |
| 23 | $Ca(N(SO_2CF_3)_2)_2$ | 0.16 | 3.35 | V-1 | 0 (3.35) | 6.5 + 45 = 51.5 | NO |
| 24 | $Ca(N(SO_2CF_3)_2)_2$ | 0.32 | 3.35 | V-2 | 0 (3.35) | 3.5 + 25 = 28.5 | YES |
| 25 | $Ca(N(SO_2CF_3)_2)_2$ | 0.64 | 3.35 | V-2 | 0 (3.35) | 9 + 39 = 48 | YES |
| 26 | $Ca(N(SO_2CF_3)_2)_2$ | 1.28 | 3.35 | V-2 | 0 (3.35) | 5 + 5.5 = 10.5 | YES |
| 27 | $C_4F_9SO_2NH^-{}^+K$ | 0.08 | 3.35 | V-0 | 2 (1.93) | 2 + 15 = 17 | NO |
| 28 | $C_4F_9SO_2NH^-{}^+K$ | 0.16 | 3.35 | V-0 | 2 (1.93) | 10 + 11.5 = 21.5 | NO |
| 29 | $(CF_3SO_2)_3C^-{}^+K$ | 0.08 | 3.35 | V-0 | 0 (1.93) | 1 + 14 = 15 | NO |
| 30 | $(CF_3SO_2)_3C^-{}^+K$ | 0.16 | 3.35 | V-0 | 1 (1.93) | 3 + 15 = 18 | NO |
| 31 | $(CF_3SO_2)_3C^-{}^+Li$ | 0.16 | 3.35 | V-0 | 0 (1.93) | 3 + 19 = 22 | NO |

TABLE D

| Sample No. | FR Additive 1 | FR Additive 2 | wt % FR Additive 1 | wt % FR Additive 2 | Sample Plaque Thickness (mm) | UL-94* Classification | Clarity (plaque thickness in mm) | $t_1$ (sec) + $t_2$ (sec) = Total Burn Time (sec) | Drips after $t_2$ |
|---|---|---|---|---|---|---|---|---|---|
| C1A | 0 | 0 | 0 | 0 | 3.35 | V-2 | 0 (3.35) | 4.5 + 81 = 85.5 | YES |
| C1B | 0 | 0 | 0 | 0 | 2.13 | V-2 | 0 (2.13) | 51 = 60 = 111 | YES |
| C2A | $C_4F_9SO_3^-{}^+K$ | N/A■ | 0.04 | 0 | 3.35 | V-0 | 0 (3.35) | 3 + 23 = 26 | NO |
| C2B | $C_4F_9SO_3^-{}^+K$ | N/A■ | 0.04 | 0 | 2.13 | V-2 | 0 (2.13) | 13.5 + 19 = 32.5 | YES |
| C3A | $C_4F_9SO_3^-{}^+K$ | N/A■ | 0.06 | 0 | 3.35 | V-0 | 1 (3.35) | 4 + 16 = 20 | NO |
| C3B | $C_4F_9SO_3^-{}^+K$ | N/A■ | 0.06 | 0 | 2.13 | V-2+ | 1 (2.13) | 7.5 + 29 = 36.5 | YES |
| C4A | $C_4F_9SO_3^-{}^+K$ | N/A■ | 0.08 | 0 | 3.35 | V-0 | 0 (3.35) | 3.5 + 16 = 19.5 | NO |
| C4B | $C_4F_9SO_3^-{}^+K$ | N/A■ | 0.08 | 0 | 2.13 | V-2+ | 0 (2.13) | 8 + 22 = 30 | YES |
| 39A | $C_4F_9SO_3^-{}^+K$ | $(CF_3SO_2)_2N^-{}^+K$ | 0.04 | 0.04 | 3.35 | V-0 | 0 (3.35) | 2.5 + 4.5 = 7 | NO |
| 39B | $C_4F_9SO_3^-{}^+K$ | $(CF_3SO_2)_2N^-{}^+K$ | 0.04 | 0.04 | 2.13 | V-2+ | 0 (2.13) | 9.5 + 31 = 40.5 | YES |
| 40A | $C_4F_9SO_3^-{}^+K$ | $(CF_3SO_2)_2N^-{}^+K$ | 0.04 | 0.12 | 3.35 | V-0 | 0 (3.35) | 2 + 13 = 15 | NO |
| 40B | $C_4F_9SO_3^-{}^+K$ | $(CF_3SO_2)_2N^-{}^+K$ | 0.04 | 0.12 | 2.13 | V-2+ | 0 (2.13) | 3.5 + 21 = 24.5 | YES |
| 41A | $C_4F_9SO_3^-{}^+K$ | $(CF_3SO_2)_2N^-{}^+K$ | 0.04 | 0.28 | 3.35 | V-0 | 0 (3.35) | 0.5 + 10 = 10.5 | NO |
| 41B | $C_4F_9SO_3^-{}^+K$ | $(CF_3SO_2)_2N^-{}^+K$ | 0.04 | 0.28 | 2.13 | V-0 | 0 (2.13) | 9 + 27 = 36 | NO |

TABLE D-continued

| Sample No. | FR Additive 1 | FR Additive 2 | wt % FR Additive 1 | wt % FR Additive 2 | Sample Plaque Thickness (mm) | UL-94* Classification | Clarity (plaque thickness in mm) | $t_1$ (sec) + $t_2$ (sec) = Total Burn Time (sec) | Drips after $t_2$ |
|---|---|---|---|---|---|---|---|---|---|
| 42A | $C_4F_9SO_3^{-+}K$ | $(CF_3SO_2)_2N^{-+}K$ | 0.06 | 0.02 | 3.35 | V-0 | 0 (3.35) | 1.5 + 13 = 14.5 | NO |
| 42B | $C_4F_9SO_3^{-+}K$ | $(CF_3SO_2)_2N^{-+}K$ | 0.06 | 0.02 | 2.13 | V-0 | 0 (2.13) | 10 + 18 = 28 | NO |
| 43A | $C_4F_9SO_3^{-+}K$ | $(CF_3SO_2)_2N^{-+}K$ | 0.06 | 0.1 | 3.35 | V-0 | 1 (3.35) | 3.5 + 11 = 14.5 | NO |
| 43B | $C_4F_9SO_3^{-+}K$ | $(CF_3SO_2)_2N^{-+}K$ | 0.06 | 0.1 | 2.13 | V-2† | 0 (2.13) | 8.5 + 16 = 24.5 | YES |
| 44A | $C_4F_9SO_3^{-+}K$ | $(CF_3SO_2)_2N^{-+}K$ | 0.06 | 0.26 | 3.35 | V-0 | 0 (3.35) | 4.5 + 7 = 11.5 | NO |
| 44B | $C_4F_9SO_3^{-+}K$ | $(CF_3SO_2)_2N^{-+}K$ | 0.06 | 0.26 | 2.13 | V-0 | 0 (2.13) | 7 + 5.5 = 12.5 | NO |
| 45A | $C_4F_9SO_3^{-+}K$ | $(C_2F_5SO_2)_2N^{-+}K$ | 0.04 | 0.04 | 3.35 | V-0 | 0 (3.35) | 3 + 12 = 15 | NO |
| 45B | $C_4F_9SO_3^{-+}K$ | $(C_2F_5SO_2)_2N^{-+}K$ | 0.04 | 0.04 | 2.13 | V-2 | 0 (2.13) | 12.5 + 34 = 46.5 | YES |
| 46A | $C_4F_9SO_3^{-+}K$ | $(C_2F_5SO_2)_2N^{-+}K$ | 0.04 | 0.12 | 3.35 | V-0 | 0 (3.35) | 4 + 9.5 = 13.5 | NO |
| 46B | $C_4F_9SO_3^{-+}K$ | $(C_2F_5SO_2)_2N^{-+}K$ | 0.04 | 0.12 | 2.13 | V-2 | 0 (2.13) | 18.5 + 21 = 39.5 | YES |
| 47A | $C_4F_9SO_3^{-+}K$ | $(C_2F_5SO_2)_2N^{-+}K$ | 0.06 | 0.1 | 3.35 | V-0 | 0 (3.35) | 9.5 + 13 = 22.5 | NO |
| 47B | $C_4F_9SO_3^{-+}K$ | $(C_2F_5SO_2)_2N^{-+}K$ | 0.06 | 0.1 | 2.13 | V-2 | 0 (2.13) | 13 + 0 = 13 | YES |
| 48A | $C_4F_9SO_3^{-+}K$ | $Ca(N(SO_2CF_3)_2)_2$ | 0.04 | 0.04 | 3.35 | V-0 | 0 (3.35) | 2.5 + 11 = 13.5 | NO |
| 48B | $C_4F_9SO_3^{-+}K$ | $Ca(N(SO_2CF_3)_2)_2$ | 0.04 | 0.04 | 2.13 | V-0 | 0 (2.13) | 10 + 19 = 29 | NO |
| 49A | $C_4F_9SO_3^{-+}K$ | $Ca(N(SO_2CF_3)_2)_2$ | 0.04 | 0.12 | 3.35 | V-2 | 0 (3.35) | 7 + 17 = 24 | YES |
| 49B | $C_4F_9SO_3^{-+}K$ | $Ca(N(SO_2CF_3)_2)_2$ | 0.04 | 0.12 | 2.13 | V-2 | 0 (2.13) | 12 + 31 = 43 | YES |
| 50A | $C_4F_9SO_3^{-+}K$ | $(CF_3SO_2)_2N^{-+}Na$ | 0.04 | 0.04 | 3.35 | V-0 | 0 (3.35) | 5.0 + 10 = 15 | NO |
| 50B | $C_4F_9SO_3^{-+}K$ | $(CF_3SO_2)_2N^{-+}Na$ | 0.04 | 0.04 | 2.13 | V-0 | 0 (2.13) | 11 + 9 = 20 | NO |
| 51A | $C_4F_9SO_3^{-+}K$ | $(CF_3SO_2)_2N^{-+}Na$ | 0.04 | 0.12 | 3.35 | V-0 | 0 (3.35) | 3 + 6.5 = 9.5 | NO |
| 51B | $C_4F_9SO_3^{-+}K$ | $(CF_3SO_2)_2N^{-+}Na$ | 0.04 | 0.12 | 2.13 | V-0 | 0 (2.13) | 4.5 + 10 = 14.5 | NO |

■N/A = Does not apply
†Qualified UL-94* V-2 rating. One sample of five issued a drip after $t_2$.

What is claimed is:

1. A flame retardant composition comprising a carbonate polymer and an additive metal salt comprising an anion selected from the group consisting of (a) a highly fluorinated methide, (b) a highly fluorinated imide, (c) a highly fluorinated amide, and any combinations thereof.

2. The flame retardant composition of claim 1 wherein said anion is selected from the group consisting of (a) a fluorinated alkylsulfonyl methide, (b) a fluorinated arylsulfonyl methide, (c) a fluorinated alkyl sulfonyl imide or (d) a fluorinated arylsulfonyl imide, (e) a fluorinated alkyl sulfonyl amide or (f) a fluorinated arylsulfonyl amide, (g) mixed aryl- and alkylsulfonyl imides, amides and methides and any combinations thereof.

3. The composition of claim 1 wherein said additive comprises an anion from the group consisting of

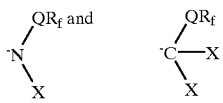

wherein

X is selected from the group consisting of H, halide, alkyl, alkenyl, aryl, alkaryl, —$SO_2R$, —$SO_2R_f$, —$SO_2F$, —$SO_3R$, —C(O)R, and —C(O)$R_f$, and —CN;

Q is a divalent organic linking group,

R is selected from the group consisting of: alkyl, aralkyl, alkyl, aryl, and aryl; and $R_f$ is a fluorinated radical containing at least one carbon atom.

4. The metal salt of claim 2 wherein Q is selected from the group consisting of —$SO_2$—, —CO—, and —$SO_3$—.

5. The composition of claim 3 wherein the anion is of a formula:

or

wherein each $R_f$ is independently a highly fluorinated alkyl or aryl radical.

6. The composition according to claim 5 wherein the anion is selected from the group consisting of $(C_2F_5SO_2)_2N^-$, $(C_4F_9SO_2)_2N^-$, $(C_8F_{17}SO_2)_3C^-$, $(CF_3SO_2)_3C^-$, $(CF_3SO_2)_2N^-$, $(C_4F_9SO_2)_3C^-$, $(CF_3SO_2)_2(C_4F_9SO_2)C^-$, $(CF_3SO_2)(C_4F_9SO_2)N^-$, $[(CF_3)_2NC_2F_4SO_2]_2N^-$, $(CF_3)_2NC_2F_4SO_2C^-(SO_2CF_3)_2$, $(3,5-(CF_3)_2C_6H_3SO_2)$ $N^-SO_2CF_3$, $C_6F_5SO_2C^-(SO_2CF_3)_2$, $C_6F_5SO_2N^-SO_2CF_3$, $CF_3SO_2(CN)N^-$, $CF_3SO_2(CN)_2C^-$, $CF_3SO_2NH^-$, $(CF_3SO_2)_2CH^-$, $C_4F_9SO_2(CN)N^-$, $C_4F_9SO_2(CN)_2C^-$, $C_4F_9SO_2NH^-$, $(C_4F_9SO_2)_2CH^-$,

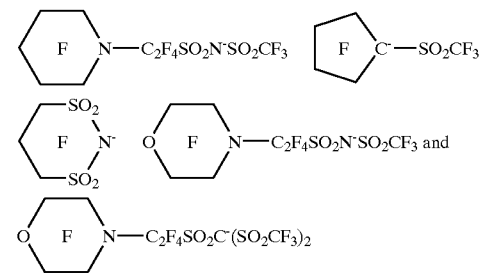

7. The composition of claim 1 further comprising a fluoroalkyl sulfonate salt.

8. The composition of claim 1 wherein said metal is selected from the group consisting of alkali metals and alkaline earth metals.

9. The composition of claim 8 wherein said alkaline earth metal is selected from the group consisting of $Ca^{2+}$, $Mg^{2+}$ and $Ba^{2+}$.

10. The composition of claim 9 wherein said additive metal salt comprises compounds of the formula $(R_fSO_2)_3C^-M^{2+}X'^-$ or

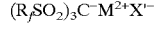

wherein X' is a halide anion, $(R_fSO_2)_3C'$, $(R_fSO_2)_2N^-$, $R_fSO_3^-$, $R_fSO_2NH^-$, $SO_3^{2-}$; $PO_4^{3-}SbF_6^-$, $PF_6^-$, $BF_4^-$, $ClO_4^-$, or $NO_3^-$ and $M^{2+}$ is an alkali car metal.

11. The composition of claim 1 wherein said composition has a flame retardancy value of V-1 when tested according to Underwriters Laboratories Tests for Flammability of Plastic Materials test UL 94.

12. The composition of claim 1 wherein said composition has a flame retardancy value of V-0 when tested according to Underwriters Laboratories Tests for Flammability of Plastic Materials test UL 94.

13. The composition of claim 1 wherein said carbonate polymer comprises a bis-(hydroxyphenyl-alkylidine) carbonate polymer.

14. The composition of claim 1 wherein said carbonate polymer is derived from a dihydroxy phenol selected from the group consisting of 2,2-bis-(4-hydroxyphenyl)propane, bis-(4-hydroxyphenyl)methane, 2,2-bis-(4-hydroxy-3,5-dimethylphenyl)propane, 2,2-bis-(4-hydroxy-3-methylphenyl)propane, 2,2-bis-(4-hydroxy-3,5-dibromophenyl)propane, 2,2-bis-(4-hydroxy-3-methylphenyl)propane, 1,1-bis-(4-hydroxyphenyl)cyclohexane, 1-bis-(4-hydroxyphenyl)sulfide, 2,2-bis-(4-hydroxy-3,5-dimethylphenyl)heptane, 2,2-(3,5,3',5'-tetrachloro-4,4'dihydroxydiphenyl)propane, 2,2-(3,5,3',5'-tetrabromo-4,4'dihydroxydiphenyl)propane, (3,3'-dichloro-4,4'dihydroxyphenyl)methane, 2,2-(3,5,-dichloro4,4'dihydroxydiphenyl)propane, and 2,2-(3,5,-dibromo-4,4'dihydroxydiphenyl)propane.

15. The composition of claim 1 wherein said carbonate polymer comprises a branched carbonate polymer.

16. The branched carbonate polymer of claim 13 comprising 0.05 to 2 mole percent of polyfunctional compounds.

17. The composition of claim 1 wherein said carbonate polymer comprises two or more different bis-hydroxyphenyl compounds.

18. The composition of claim 1 wherein said metal additive salt comprises 0.01 to 2 weight percent, relative to the carbonate polymer.

19. A process of producing a flame retardant carbonate polymer comprising the steps of
   providing a carbonate polymer, and
   adding a sufficient amount of an additive metal salt comprising an anion selected from the group consisting of (a) a highly fluorinated methide, (b) a highly fluorinated imide, (c) a highly fluorinated amide, and any combinations thereof.

20. The process of claim 19 wherein said anion is selected from the group consisting of (a) a fluorinated alkylsulfonyl methide, (b) a fluorinated arylsulfonyl methide, (c) a fluorinated alkyl sulfonyl imide or (d) a fluorinated arylsulfonyl imide, (e) a fluorinated alkyl sulfonyl amide or (f) a fluorinated arylsulfonyl amide, (g) mixed aryl- and alkylsulfonyl imides, amides and methides and any combinations thereof.

21. The process of claim 19 wherein said additive comprises an anion selected from the group consisting of

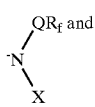 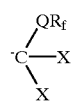

wherein
   X is selected from the group consisting of H, halide, alkyl, alkenyl, aryl, alkaryl, —SO$_2$R, —SO$_2$R$_f$, —SO$_2$F, —SO$_3$R, —C(O)R, and —C(O)R$_f$, and —CN;
   Q is a divalent organic linking group,
   R is selected from the group consisting of: alkyl, cycloalkyl, aralkyl, alkyl, aryl, and aryl; and
   R$_f$ is a fluorinated radical containing at least one carbon atom.

22. The process of claim 21 wherein Q is selected from the group consisting of —SO$_2$—, —CO—, and —SO$_3$—.

23. The process of claim 21 wherein the salt is selected from the group consisting of (C$_2$F$_5$SO$_2$)$_2$N$^-$, (C$_4$F$_9$SO$_2$)$_2$N$^-$, (C$_8$F$_{17}$SO$_2$)$_3$C$^-$, (CF$_3$SO$_2$)$_3$C$^-$, (CF$_3$SO$_2$)$_2$N$^-$, (C$_4$F$_9$SO$_2$)$_3$C$^-$, (CF$_3$SO$_2$)$_2$(C$_4$F$_9$SO$_2$)C$^-$, (CF$_3$SO$_2$)(C$_4$F$_9$SO$_2$)N$^-$, [(CF$_3$)$_2$NC$_2$F$_4$SO$_2$]$_2$N$^-$, (CF$_3$)$_2$NC$_2$F$_4$SO$_2$C$^-$(SO$_2$CF$_3$)$_2$, (3,5bis-(CF$_3$)C$_6$H$_3$)SO$_2$N$^-$SO$_2$CF$_3$, C$_6$F$_5$SO$_2$C$^-$(SO$_2$CF$_3$)$_2$, C$_6$F$_5$SO$_2$N$^-$SO$_2$CF$_3$, CF$_3$SO$_2$(CN)N$^-$, CF$_3$SO$_2$(CN)$_2$C$^-$, CF$_3$SO$_2$NH$^-$, (CF$_3$SO$_2$)$_2$CH$^-$, C$_4$F$_9$SO$_2$(CN)N$^-$, C$_4$F$_9$SO$_2$(CN)$_2$C$^-$, C$_4$F$_9$SO$_2$NH$^-$, (C$_4$F$_9$SO$_2$)$_2$CH$^-$,

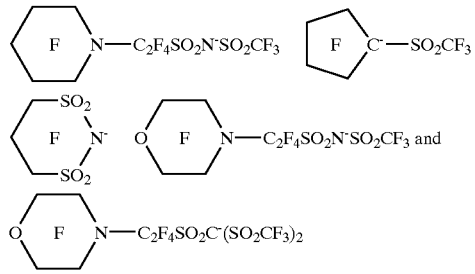

24. The process of claim 21 wherein said metal is selected from the group consisting of alkaline metals and alkali earth metals.

25. The composition of claim 24 wherein said alkaline earth metal is selected from the group consisting of Ca$^{2+}$, Mg$^{2+}$ and Ba$^{2+}$.

26. The composition of claim 23 wherein said additive metal salt comprises compounds of the formula

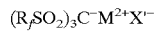

or

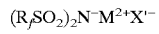

wherein X' is a halide anion, (R$_f$SO$_2$)$_3$C$^-$, (R$_f$SO$_2$)$_2$N$^-$, R$_f$SO$_3^-$, R$_f$SO$_2$NH$^-$, SO$_3^{2-}$, PO$_4^{3-}$SbF$_6^-$, PF$_6^-$, BF$_4^-$, ClO$_4^-$, or NO$_3^-$ and M$^{2+}$ is an alkali earth metal.

27. A shaped article comprising a comprising a carbonate polymer and an additive metal salt comprising an anion selected from the group consisting of (a) a highly fluorinated methide, (b) a highly fluorinated imide, (c) a highly fluorinated amide, and any combinations thereof, said additive in an amount sufficient to improve the flame retardancy of the article.

28. The shaped article of claim 27, wherein said additive metal salt comprises 0.01 to 2 weight percent, relative to the carbonate polymer.

29. The shaped article of claim 27 wherein said article is molded, cast or extruded.

30. The shaped article of claim 27 wherein said additive comprises an anion selected from the group consisting of

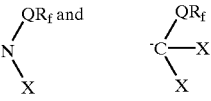 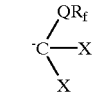

wherein
   X is selected from the group consisting of H, halide, alkyl, alkenyl, aryl, alkaryl, —SO$_2$R, —SO$_2$R$_f$, —SO$_2$F, —SO$_3$R, —C(O)R, and —C(O)R$_f$, and —CN;

Q is a divalent organic linking group,

R is selected from the groups: alkyl, cycloalkyl, aralkyl, alkyl, aryl, and aryl, and $R_f$ is a fluorinated radical containing at least one carbon atom.

31. The shaped article of claim 27 wherein the anion is of a formula:

$$(R_fSO_2)_3C^-$$

or $$(R_fSO_2)_2N^-$$

wherein each $R_f$ is independently a highly fluorinated alkyl or aryl radicals.

32. The shaped article of claim 27 wherein said metal additive salt comprises 0.01 to2 weight percent, relative to the carbonate polymer.

* * * * *

UNITED STATES PATENT AND TRADEMARK OFFICE
CERTIFICATE OF CORRECTION

PATENT NO. : 6,518,347 B1
APPLICATION NO. : 09/749101
DATED : February 11, 2003
INVENTOR(S) : Steven D. Boyd It is certified that error appears in the above-identified patent and that said Letters Patent is hereby corrected as shown below:

Column 7
Line 26, delete "compoundsfunction" and insert -- compounds function --, therefor.

Column 8
Line 23, after "39A-51B" delete "." and insert -- , --, therefor.
Line 34, after "27-28" delete "." and insert -- , --, therefor.
Line 38, after "28-30" delete "." and insert -- , --, therefor.

Column 9
Line 47, delete "," and insert -- ; --, therefor.

Column 13
Line 55, in Claim 3, after "of" delete ":"
Line 55, in Claim 3, after "alkyl," insert -- cycloalkyl, --.

Column 14
Line 65, in Claim 10, delete "($R_fSO_2)_3C$" and insert -- $(R_fSO_2)_3$ $C^-$ --, therefor.
Line 66, in Claim 10, delete ";" and insert -- , --, therefor.
Line 67, in Claim 10, delete "car" and insert -- earth --, therefor.

Column 15
Line 24, in Claim 14, delete "dichloro4" and insert -- dichloro-4 --, therefor.
Line 66, in Claim 21, after "of" delete ":".

Column 17
Line 2, in Claim 30, delete "groups:" and insert -- group consisting of --, therefor,
Line 3, in Claim 30, after "and aryl" delete "," and insert -- ; --, therefor.

UNITED STATES PATENT AND TRADEMARK OFFICE
CERTIFICATE OF CORRECTION

PATENT NO. : 6,518,347 B1
APPLICATION NO. : 09/749101
DATED : February 11, 2003
INVENTOR(S) : Steven D. Boyd It is certified that error appears in the above-identified patent and that said Letters Patent is hereby corrected as shown below:

<u>Column 18</u>
Line 8, in Claim 32, delete "to2" and insert -- to 2 --, therefor.

Signed and Sealed this

Eighth Day of May, 2007

JON W. DUDAS
*Director of the United States Patent and Trademark Office*